(12) United States Patent
Abdulrazzaq et al.

(10) Patent No.: US 11,933,119 B1
(45) Date of Patent: Mar. 19, 2024

(54) CURING LOST CIRCULATION OF OIL-BASED DRILLING MUDS

(71) Applicant: Halliburton Energy Services, Inc., Houston, TX (US)

(72) Inventors: Waseem Abdulrazzaq, Dhahran (SA); Jay Deville, Houston, TX (US); Carlos Arturo Carrera, Dhahran (SA)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 18/101,460

(22) Filed: Jan. 25, 2023

(51) Int. Cl.
| E21B 21/00 | (2006.01) |
| C09K 8/36 | (2006.01) |
| C09K 8/502 | (2006.01) |
| E21B 21/06 | (2006.01) |

(52) U.S. Cl.
CPC .............. *E21B 21/003* (2013.01); *C09K 8/36* (2013.01); *C09K 8/502* (2013.01); *E21B 21/062* (2013.01)

(58) Field of Classification Search
CPC .......... E21B 21/003; C09K 8/36; C09K 8/502
USPC .......................................................... 175/72
See application file for complete search history.

(56) References Cited

U.S. PATENT DOCUMENTS

| 5,382,290 A | 1/1995 | Nahm et al. |
| 5,515,921 A | 5/1996 | Cowan et al. |
| 8,695,705 B2 | 4/2014 | Miller et al. |
| 9,322,231 B2 | 4/2016 | Jamison et al. |
| 9,410,065 B2 | 8/2016 | Jamison et al. |
| 9,695,653 B2 | 7/2017 | Amanullah et al. |
| 9,701,882 B2 | 7/2017 | Galindo et al. |
| 9,777,207 B2 | 10/2017 | Jamison et al. |

(Continued)

FOREIGN PATENT DOCUMENTS

| WO | 2014164381 A1 | 10/2014 |
| WO | 2021066814 A1 | 4/2021 |

OTHER PUBLICATIONS

Yue, Acid Precursors for Enhanced Inhibitor Placement in Scale Squeeze Treatments, U.S. Appl. No. 17/553,303, filed Dec. 16, 2021.

(Continued)

*Primary Examiner* — Zakiya W Bates
*Assistant Examiner* — Ashish K Varma
(74) *Attorney, Agent, or Firm* — Thomas Rooney; C. Tumey Law Group PLLC

(57) ABSTRACT

A method may include: circulating an oil-based drilling fluid though a drill string to extend a wellbore through a subterranean formation, wherein the oil-based drilling fluid comprises an invert emulsion; separating at least a portion of the oil-based drilling fluid from the circulated oil-based drilling fluid to form a separated portion of oil-based drilling fluid; mixing a metal salt and a metal oxide into the separated portion of the oil-based drilling fluid to form a chemical sealing pill; introducing the chemical sealing pill into the drill string and flowing the chemical sealing pill into a lost circulation zone in the subterranean formation; allowing at least a portion of the chemical sealing pill to set in the lost circulation zone to form a set plug, wherein the set plug seals the lost circulation zone and reduces loss of fluid into the lost circulation zone from subsequently introduced fluids; and preventing loss of fluid into the lost circulation zone from subsequently introduced fluids with the set plug.

20 Claims, 3 Drawing Sheets

(56) References Cited

U.S. PATENT DOCUMENTS

| | | | |
|---|---|---|---|
| 9,920,604 | B2 | 3/2018 | Jamison et al. |
| 10,590,338 | B2 | 3/2020 | Hall et al. |
| 10,717,912 | B2 | 7/2020 | Zhou et al. |
| 10,954,423 | B2 * | 3/2021 | Braley .................... C09K 8/42 |
| 10,982,125 | B2 * | 4/2021 | Whitfill .................. C04B 14/10 |
| 11,168,241 | B2 | 11/2021 | Goel et al. |
| 11,414,590 | B2 | 8/2022 | Zhou et al. |
| 11,447,679 | B2 | 9/2022 | Hall et al. |
| 11,535,794 | B1 | 12/2022 | Abdulrazzaq et al. |
| 2005/0269085 | A1 | 12/2005 | Cowan |
| 2005/0284667 | A1 * | 12/2005 | Davidson ................. C09K 8/34 175/72 |
| 2014/0209387 | A1 | 7/2014 | Jamison et al. |
| 2014/0209390 | A1 | 7/2014 | Jamison et al. |
| 2014/0209391 | A1 | 7/2014 | Jamison et al. |
| 2017/0369757 | A1 | 12/2017 | Pisklak et al. |
| 2019/0367800 | A1 | 12/2019 | Oliveira et al. |
| 2020/0157894 | A1 * | 5/2020 | Whitfill ................. E21B 21/062 |
| 2021/0332285 | A1 | 10/2021 | May et al. |
| 2021/0388683 | A1 | 12/2021 | Li et al. |
| 2022/0235259 | A1 * | 7/2022 | May ....................... C04B 26/285 |

OTHER PUBLICATIONS

Nahm et al., Interfacial Sealing Properties of Slag Mix (Mud-to-Cement Conversion Technology): Laboratory and Field Evaluation, SPE/IADC 29407 Drilling Conference, Amsterdam, Feb. 1995.

Mueller et al., Blast Furnace Slag Technology: Features, Limitations, and Practical Applications, SPE 28475, Society of Petroleum Engineers 69th Annual Technical Conference and Exhibition, New Orleans, LA, USA, Sep. 1994.

Liu et al., Mud-to-cement conversion of non-aqueous drilling fluids using alkali-activated fly ash, Journal of Petroleum Science and Engineering, Nov. 2019, vol. 182, 106242, ScienceDirect.

Xiangyu Liu, Mud-to-Cement Conversion of Synthetic-Based Drilling Muds using Geopolymers, Dissertation, The University of Texas at Austin, Aug. 2017.

Abdulrazzaq et al., Chemical Sealant Loss Circulation Materials for Fractured Formations: Right-Angle Viscosity Development with High Plugging Efficiency, SPE-192328-MS, Society of Petroleum Engineers Kingdom of Saudi Arabia Annual Technical Symposium and Exhibition held in Dammam, Saudi Arabia, Apr. 2018.

Cui et al., Preparation and Properties of Magnesium Oxysulfate Cement and its Application as Lost Circulation Materials, Petroleum Science 18(2021)1492-1506, Aug. 2021.

Wilson et al., Conversion of Mud to Cement, SPE 20452, Society of Petroleum Engineers 65th Annual Technical Conference and Exhibition of the Society of Petroleum Engineers, New Orleans, LA, USA, Sep. 1990.

Cowan et al., Conversion of Drilling Fluids to Cements with Blast Furnace Slag: Performance Properties and Applications for Well Cementing, SPE 24575, Society of Petroleum Engineers 67th Annual Technical Conference and Exhibition, Washington, DC, Oct. 1992.

Javanmardi et al., Mud to Cement Technology Proven in Offshore Drilling Project, Oil and Gas Journal, vol. 91:7, Journal ID: ISSN 0030-1388, osti.gov, Feb. 1993.

Schlemmer et al., Drilling Fluid Conversion: Selection and Use of Portland or Blast-Furnace-Slag Cement, SPE Drilling & Completion, SPE Annual Technical Conference and Exhibition held in Houston, Oct. 1993.

International Search Report and Written Opinion for International Patent Application No. PCT/US2023/076413 dated Jan. 25, 2024. PDF file. 8 pages.

* cited by examiner

CURING LOST CIRCULATION OF OIL-BASED DRILLING MUDS

BACKGROUND

A natural resource such as oil or gas may be recovered from a subterranean formation by drilling a wellbore into the formation. During drilling of the wellbore, a drilling fluid or as it is also known, drilling mud, is circulated along the drill string to lubricate the drill bit, carry drill cuttings to the surface, and to provide hydrostatic pressure to the wellbore to counteract formation pressure and prevent wellbore collapse, among other things. One problem associated with drilling is the undesirable loss of drilling and other fluids (e.g., spacer fluids, completion fluids, fracturing fluids, etc.) to the formation. For example, fluids may enter into voids that are naturally present in the formation (e.g., pre-existing open fractures, large openings with structural strength, etc.) or into voids caused anthropogenically (e.g., induced fractures, such as by excessive mud pressures, etc.). This problem is known as "lost circulation," and the void-containing regions are known as "lost circulation zones."

Fluid loss into lost circulation zones is undesirable because of the expenses associated therewith, unplanned downtime, and in extreme cases, need for well abandonment. Fluid replacement, in addition to increasing operating expenses, may also create additional worksite problems by requiring additional fluid storage, additional manpower, additional equipment, and may create an undue environmental burden.

BRIEF DESCRIPTION OF THE DRAWINGS

These drawings illustrate certain aspects of some of the examples of the present disclosure and should not be used to limit or define the method.

DETAILED DESCRIPTION

Figure 1:
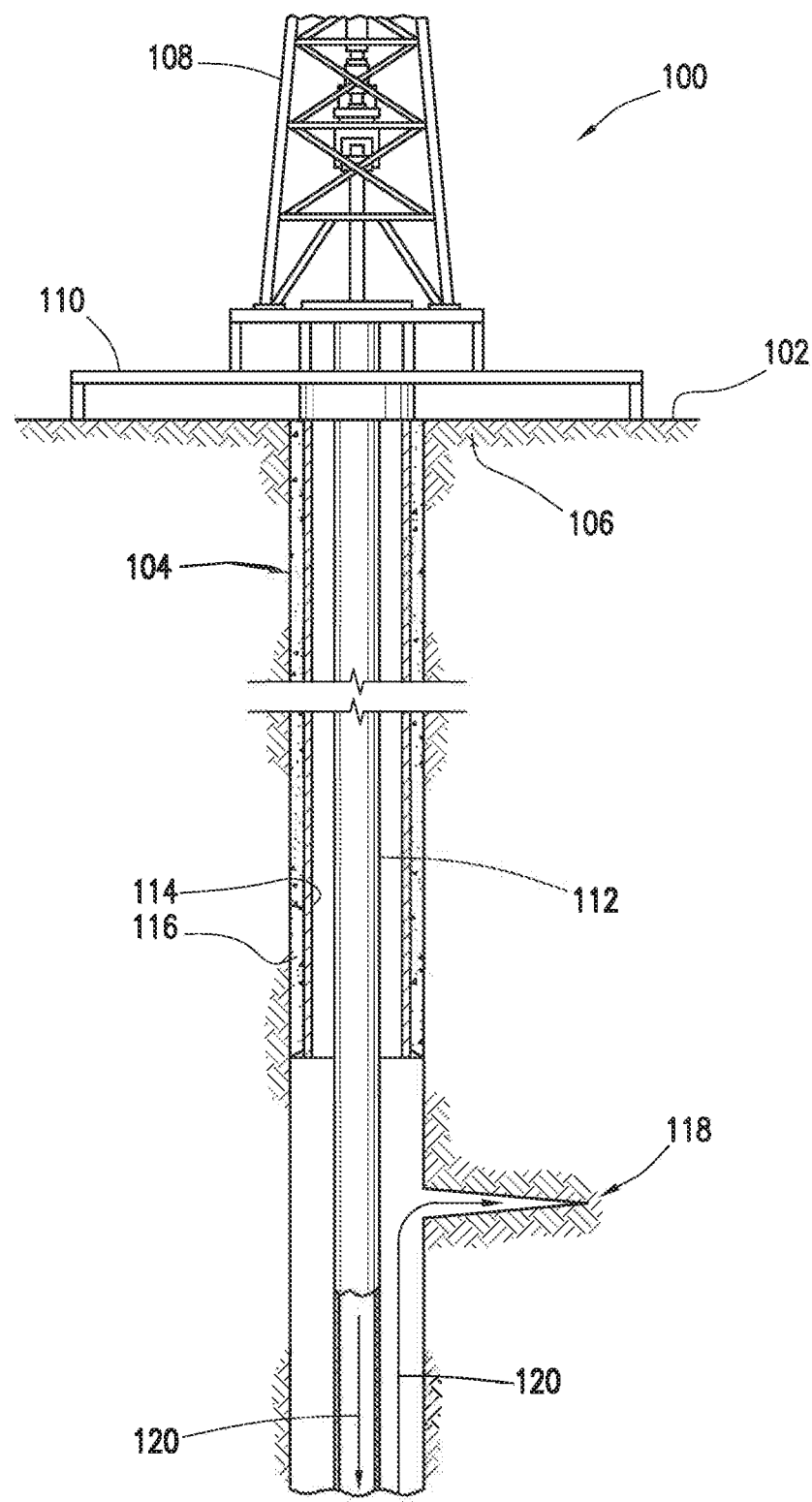
FIG. 1 illustrates a system for using a chemical sealing pill while drilling equipment is present in a wellbore in accordance with some examples of the present disclosure.

Disclosed herein are methods and systems for servicing a wellbore in a subterranean formation and, more particularly, disclosed are methods and systems for introducing a chemical sealing pill into a lost circulation zone. The chemical sealing pill may comprise an oil-based drilling fluid, a metal salt, and a metal oxide.

There are many advantages to the methods and systems as presently disclosed, only some of which are discussed or alluded to herein. One such advantage is that lost circulation events, including severe and total lost circulation events, may be rapidly addressed. For example, both a total amount of fluid lost to a lost circulation zone during a lost circulation event and a total amount of nonproductive time resulting from the event may be reduced through the methods disclosed herein.

Another advantage includes, in certain examples, allowing for on-the-fly treatment of a wellbore. On-the-fly treatment may be preferable in certain situations when, for example, it is desirable to adapt a wellbore treatment to a changing wellbore condition (e.g., formation temperature, wellbore pressure, formation porosity, mud composition), especially if the condition is variable or unanticipated. Changes in such conditions may arise as a result of, for example, penetrating a new region of a formation during drilling (i.e., high-porosity region, cavernous region, etc.), during a lost circulation event, etc., and it is desirable to quickly adapt a wellbore treatment in response to such changes.

Another advantage includes, in certain examples, requiring less space at a rig site. For example, certain examples disclosed herein may provide methods and/or techniques for bypassing conventional systems (e.g., pumping, mixing, and/or other equipment) for introducing treatment materials into a drill string. In some examples, treatment materials may be introduced into a lost circulation zone using existing pumping systems (i.e., for circulating drilling fluid) or without a pumping system or need for additional equipment.

Other advantages include, in certain examples, shorter setting times as compared to conventional settable compositions, acid solubility of a sealing material after treatment, decreased mixing time, convenient handling of materials (e.g., dry powder in certain examples), and overall reduced material cost.

Examples of the methods described herein may generally include an oil-based drilling fluid. Oil-based drilling fluids may include oleaginous base fluid and optionally, water and additives. In some examples, the oil-based drilling fluids may include an invert emulsion. An invert emulsion may comprise between about 50:50 to about 95:5, about 50:50 to about 80:20, about to about 80:20, or about 60:40 to about 70:30 by volume external oleaginous phase to aqueous internal phase. In other examples, the oil-based drilling fluid may comprise an all-oil mud, wherein the mud comprises 100% oil by volume and has no aqueous internal phase.

An external phase of an invert emulsion may include any suitable carbonaceous compound or mixture of compounds including an alkane, an olefin, an aromatic organic compound, a cyclic alkane, a paraffin, a diesel fluid, a mineral oil, a desulfurized hydrogenated kerosene, crude oil, synthetic oil, petroleum distillate, kerosene, gas oil, fuel oil, a polyolefin, polydiorganosiloxane, siloxane, organosiloxane, an isomerized or internal olefin, a glyceride triester, (e.g., rapeseed oil, olive oil, canola oil, castor oil, coconut oil, corn oil, cottonseed oil, lard oil, linseed oil, neatsfoot oil, palm oil, peanut oil, perilla oil, rice bran oil, safflower oil, sardine oil, sesame oil, soybean oil, and sunflower oil), a linear alpha olefin, naphthenes, napthenic hydrocarbons, one or more esters, fatty acids, alcohols, a cycloparaffinic compound, other hydrocarbons, and/or combinations thereof.

An internal phase of an oil-based drilling fluid may include water. Water may be derived from any suitable source, and may comprise fresh water, saltwater (e.g., water containing one or more salts dissolved therein like sodium chloride, calcium chloride, and calcium nitrate), brine (e.g., saturated or near saturated salt water), seawater, field water, stream water, ground water, the like, and/or any combination thereof.

The oil-based drilling fluid may further include calcium chloride (e.g., $CaCl_2$ about wt. %) and/or an emulsifier. An emulsifier may be included in the oil-based drilling fluid to, for example, stabilize the invert emulsion and/or encourage the suspension of the internal phase in the external phase. Any suitable emulsifier may be used including a calcium soap, a polyamide, an imidazolines, an organophilic lignite, the like, and/or combinations thereof.

The oil-based drilling fluid may also include rheology modifiers (e.g., dimeric and trimeric fatty acids), weighting agents, and/or copolymer filtration control additives. Particulates may be included in the oil-based drilling fluids such as high gravity particulates (e.g., barite, hematite, ilmenite, galena, manganese oxide, iron oxide, manganese tetroxide, magnetite, siderite, celestite, dolomite, manganese carbonate) and/or low gravity particulates (e.g., calcium carbonate, marble, polyethylene, polypropylene, limestone, salt, shale, bentonite, graphitic material, silica, kaolinite sepiolite, hectorite, organoclay, insoluble polymeric material, calcite). Other additives used in the oil-based drilling fluid may include any suitable additive needed to modify a rheological, thixotropic, or other fluid property, such as density, lubricity, or specific gravity. Suitable examples of rheology, thixotropy, density, lubricity, specific gravity, or additives are provided throughout the disclosure and may include, for example, barium sulfate (barite), calcium carbonate, hematite, bentonite clay, xanthan gum, guar gum, glycol, and starch.

The chemical sealing pill may be added to a portion of the oil-based drilling fluid, for example, prior to introduction of the portion of the fluid to the wellbore. The chemical sealing pill may be added in any suitable manner, or by any suitable means to the oil-based drilling fluid such that the chemical sealing pill is introduced into the wellbore to contact the lost circulation zone. For example, the chemical sealing pill may be included with a portion of fluid taken from a recirculated oil-based drilling fluid, with a portion taken from an oil-based drilling fluid make-up stream, or the like. In some examples, the chemical sealing pill may be first prepared with a portion of fluid removed or separated from a recirculating oil-based drilling or from an oil-based drilling fluid make-up stream, to then be added to another portion of an oil-based drilling fluid entering the wellbore.

As mentioned, the chemical sealing pill comprises a metal salt. A metal salt may comprise a salt-forming cation ionically bonded to a salt-forming anion. A salt-forming cation may be a metal cation, such as a metal cation selected from Mg', Ca', Sr', Zn', or any combination thereof. A salt-forming anion may be an anion selected from sulfate, sulfate hydrate, hydroxide, chloride, nitrate, nitrite, phosphate, carbonate, citrate, fluoride, or combinations thereof. The metal salt may have complete or partial solubility which, for example, may depend on wellbore conditions (e.g., acidity, salinity, temperature). Some particular metal salts may include, magnesium sulfate, magnesium sulfate-hydrate, magnesium phosphate, zinc chloride, or any combinations thereof.

The chemical sealing pill further comprises a metal oxide such as a group II metal oxide. Examples of metal oxides may include magnesium oxide, calcium oxide, strontium oxide or combinations thereof. An example of one suitable metal oxide includes magnesium oxide, such as light burned magnesium oxide, dead burned magnesium oxide, or hard burned magnesium oxide. In certain examples, it may be preferred to use a dead burned or a hard burned magnesium oxide rather than a light-burned magnesium oxide when a slower chemical reactivity is desired. In other examples, it may be desirable to use a mixture of dead, hard, and/or light burned magnesium oxide if a particular chemical reactivity is desired.

The metal oxide may include calcined metal oxides. For example, in some examples, the metal oxide may have undergone calcination at a temperature above 700° C., above 800° C., above 900° C., above 1,000° C., above 1,100° C., above 1,200° C., above 1,300° C., above 1,400° C., above 1,500° C., above 1,600° C., above 1,700° C., above 1,800° C., above 1,900° C., above 2,000° C., below 700° C., below 800° C., below 900° C., below 1,000° C., below 1,100° C., below 1,200° C., below 1,300° C., below 1,400° C., below 1,500° C., below 1,600° C., below 1,700° C., below 1,800° C., below 1,900° C., below 2,000° C., between 700° C. and 1000° C., between 1,000° C. and 1,500° C., between 1,500° C. and 2,000° C., between 700° C. and 1,500° C., between 1,000° C. and 2,000° C., or combinations thereof. In some examples, a metal oxide in accordance with the present disclosure may comprise a blend of multiple metal oxide components, such as a blend comprising at least a first metal oxide component and a second metal oxide component. The first metal oxide component may comprise any suitable metal oxide having undergone calcination at a first temperature selected from the above-listed values, and a second metal oxide component may comprise any of a different or the same metal oxide having undergone calcination at a second temperature selected from any of the above-listed temperatures. It may be desirable in certain examples to vary the ratio of one metal oxide component to another to, for example, ensure a desired chemical reactivity of the chemical sealing pill and/or control a setting time thereof.

Light burned magnesium oxide may comprise magnesium oxide calcined at temperatures ranging from 700° C. to 1000° C., or a range therebetween. Hard burned magnesium oxide may comprise magnesium oxide calcined at a temperature ranging from 1000° C. to 1500° C., or a range therebetween Dead burned magnesium oxide may comprise magnesium oxide calcined at a temperature ranging from 1500° C. to 2000° C., or a range therebetween. As mentioned previously, it may be desirable to vary the relative amounts of light-burned magnesium oxide, hard-burned magnesium oxide, and/or dead-burned magnesium to, for example, adjust a chemical reactivity of the chemical sealing pill.

In some examples, a light burned magnesium oxide and a hard burned magnesium oxide may be present in the chemical sealing pill in a ratio of between about 3:1 to about 1:3, about 2:1 to about 1:2, or about 1.5:1 to about 1:1.5 by mass. In some examples, a light burned magnesium oxide and a dead burned magnesium oxide may be present in the chemical sealing pill in a ratio of between about 3:1 to about 1:3, about 2:1 to about 1:2, or about 1.5:1 to about 1:1.5 by mass. In some examples, a hard burned and a dead burned magnesium oxide may be present in the chemical sealing pill in a ratio of between about 3:1 to about 1:3, about 2:1 to about 1:2, about 1.5:1 to about 1:1.5 by mass, or any ranges therebetween. In some examples, the chemical sealing pill may be free or substantially free of hard-burned magnesium oxide, light-burned magnesium oxide, dead-burned magnesium oxide, and/or combinations thereof.

In some examples, a ratio of a first metal oxide component and a second metal oxide component may be approximately 0.1:1, between about 10:1 of the first metal oxide component to the second metal oxide component. Alternatively, from about 0.1:1 to about 0.1:1, about 0.5:1 to about 1:1, about 1:1 to about 2:1, about 2:1 to about 5:1, about 5:1 to about 10:1, and any ranges therebetween.

The metal salt and metal oxide may be present in the chemical sealing pill in a weight ratio of between about 1:0.5 to about 1:4 metal salt to metal oxide. Alternatively, from about 1:0.5 to about 1:1, about 1:1 to about 1:1.5, about 1:1.5 to about 1:2, about 1:2 to about 1:2.5, about 1:2.5 to about 1:3, about 1:3 to about 1:3.5, about 1:3.5 to about 1:4, and any ranges therebetween.

The chemical sealing pill may be prepared by combing the metal salt and metal oxide with an oil-based drilling fluid. In examples, the metal salt and metal oxide may be combined with a volume of oil-based drilling fluid in an amount between about 500 grams per liter to 5000 grams per liter by volume of oil-based drilling fluid. Alternatively, in an amount of about 500 grams per liter to about 700 grams per liter, about 700 grams per liter to about 900 grams per liter, about 900 grams per liter to about 1100 grams per liter, about 1100 grams per liter to about 1300 grams per liter, about 1300 grams per liter to about 1500 grams per liter, about 1500 grams per liter to about 1600 grams per liter, about 1600 grams per liter to about 1700 grams per liter, about 1700 grams per liter to about 1800 grams per liter, about 1800 grams per liter to about 2000 grams per liter, about 2000 grams per liter to about 2200 grams per liter, about 2200 grams per liter to about 2400 grams per liter, about 2400 grams per liter to about 2600 grams per liter, about 2600 grams per liter to about 2800 grams per liter, about 2800 grams per liter to about 3000 grams per liter, about 3000 grams per liter to about 3500 grams per liter, about 3500 grams per liter to about 4000 grams per liter, about 4000 grams per liter to about 4500 grams per liter, about 4500 grams to about 5000 grams per liter, and any ranges therebetween. In some examples, the metal salt and metal oxide may be combined with about 1600 grams per liter of oil-based drilling fluid, about 1700 grams per liter of oil-based drilling fluid, or about 1800 grams per liter of oil-based drilling fluid.

The term "substantially free of" herein refers to an amount less than about 0.1% by weight of a mixture or composition. In certain examples, the chemical sealing pill may be free or substantially free of particulates besides the metal salt, metal oxide, and oil-based drilling fluid.

In some examples, a light burned magnesium oxide and a hard burned magnesium oxide may be present in the chemical sealing pill in a ratio of between about 3:1 to about 1:3, about 2:1 to about 1:2, about 1.5:1 to about 1:1.5 light burned magnesium oxide to hard burned magnesium oxide by mass, or any ranges therebetween. In some examples, a light burned magnesium oxide and a dead burned magnesium oxide may be present in the chemical sealing pill in a ratio of between about 3:1 to about 1:3, about 2:1 to about 1:2, about 1.5:1 to about 1:1.5 light burned magnesium oxide to dead burned magnesium oxide by mass, or any ranges therebetween. In some examples, a hard burned magnesium oxide and a dead burned magnesium oxide may be present in the chemical sealing pill in a ratio of between about 3:1 to about 1:3, about 2:1 to about 1:2, about 1.5:1 to about 1:1.5 hard burned magnesium oxide to dead burned magnesium oxide by mass, or any ranges therebetween. In some examples, the chemical sealing pill may be substantially free of any of light burned magnesium oxide, hard burned magnesium oxide, dead burned magnesium oxide, or a combination thereof.

The chemical sealing pill may further include one or more optional additives. Such additives may be optionally included in a chemical sealing pill as set retarders, set accelerators, viscosity and rheology (e.g., gel strength) modifiers and stabilizers, dispersants, surfactants, supplementary cementitious components, additional settable materials (e.g., hydratable polymers, latex, epoxies, resins), polymeric or non-polymeric crosslinking agents (e.g., inorganic crosslinking agents), supplementary non-cementitious components, bridging agents, acid precursors, delayed acid precursors (e.g., acid precursors encapsulated by a degradable material), additional lost circulation materials, weighting agents, lightweight additives, gas-generating additives, mechanical-property-enhancing additives, filtration-control additives, defoaming agents, foaming agents, thixotropic additives, acid-soluble fillers, nanoparticles (e.g., colloidal nano-silica), amorphous silica, clays, swellable clays, nano-clays, synthetic clays, drilling fluid additives, catalysts, clay control agents, biocides, friction reducers, flocculants, $H_2S$ scavengers, $CO_2$ scavengers, oxygen scavengers, lubricants, breakers, relative permeability modifiers, resins, wetting agents, coating enhancement agents, filter cake removal agents, antifreeze agents (e.g., ethylene glycol), curing agents, gel time moderating agents, curing activators, natural fibers, synthetic fibers, tackifying agents, diverting agents, proppant, gas, nitrogen, carbon dioxide, surface modifying agents, scale inhibitors, or combinations thereof.

In certain examples, a set retarder may be included in the chemical sealing pill. A broad variety of set retarders may be suitable for use including phosphonic acid, derivatives of phosphonic acid, citric acid (e.g., anhydrous citric acid), boric acid, borax, lignosulfonates, salts, organic acids, carboxymethylated hydroxyethylated celluloses, synthetic co- or ter-polymers comprising sulfonate and carboxylic acid groups, borate compounds, derivatives thereof, or mixtures thereof. In some examples, a set retarder may be present in the chemical sealing pill in any suitable amount, such as in an amount of about 0.01 wt. % to about 20 wt. % by weight of the chemical sealing pill. Alternatively, from about 0.01 wt. % to about 0.1 wt. %, about 0.1 wt. % to about 0.5 wt. %, about 0.5 wt. % to about 1 wt. %, about 1 wt. % to about 5 wt. %, about 5 wt. % to about 10 wt. %, about 10 wt. % to about 20 wt. %, or any ranges therebetween.

In certain examples, the chemical sealing pill may further include a dispersant. Examples of suitable dispersants include sulfonated-formaldehyde-based dispersants (e.g., sulfonated acetone formaldehyde condensate), polycarboxylated ether dispersants, polyoxyethylene phosphates, polyox polycarboxylates.

Thixotropic additives may be included in the chemical sealing pill to, for example, provide a chemical sealing pill that may be pumpable as a thin or low viscosity fluid, but when allowed to remain quiescent attains a relatively high viscosity. Among other things, thixotropic additives may be used to help control free water, create rapid gelation as the composition sets, combat lost circulation, prevent "fallback" in annular column, and minimize gas migration. Examples of suitable thixotropic additives include, but are not limited to, gypsum, water soluble carboxyalkyl, hydroxyalkyl, mixed carboxyalkyl hydroxyalkyl either of cellulose, polyvalent metal salts, zirconium oxychloride with hydroxyethyl cellulose, or a combination thereof.

The chemical sealing pill may further include an acid soluble filler. An acid-soluble filler may be used, for example, to provide an additional acid-soluble component so that more of the set plug of a chemical sealing pill can be dissolved and removed. This may be desirable, for example, if the chemical sealing pill is used in a producing zone. Examples of suitable acid-soluble fillers include dolomite, magnesium carbonate, calcium carbonate, and zinc carbonate. In an example, the acid-soluble filler may include sub-micron size filler having a particle size in the range of 100 nm to 1 micron and, for example, between 200 nm to 800 nm. For example, sub-micron-calcium carbonate may be used in accordance with examples of the present disclosure. The calcium carbonate may have a particle size greater than 1 micron. Where used, the acid-soluble filler may be present in the chemical sealing pill in an amount of from about 0.1% to about 300% by weight of the combined metal oxide and metal salt. In an example, the acid-soluble filler is present in an amount of from about 15% to about 50% by weight of the combined metal oxide and metal salt in the chemical sealing pill.

The chemical sealing pill may further include one or more supplementary cementitious components. Suitable supplementary cementitious components may include, for example, Portland cement, fly ash, slag cement, hydraulic cement, pozzolana cements, gypsum cements, high-alumina-content cements, slag cements, and combinations thereof. One or more supplementary cementitious components may be present in the chemical sealing pill in an amount, for example, of about 0.1% to about 25% by weight of the chemical sealing pill. In some examples, the one or more cementitious components may be present in an amount of about 10% to about 20% by weight of the chemical sealing pill. In some examples, the one or more cementitious components may be present in amount of about 13% to about 20% by weight of the chemical sealing pill.

The chemical sealing pill may further include one or more additional settable materials. Suitable examples of additional settable materials include hydratable polymers, latex, resins, epoxies, and combinations thereof. Additional settable materials may be used when, for example, it is desirable to provide the chemical sealing pill or a set plug of the chemical sealing pill with additional mechanical, fluid, or other properties. In some examples, the additional settable materials may be included in the chemical sealing pill in an amount of about 0.1 wt. % to about 25 wt. %. Alternatively, about 0.1 wt. % to about 5 wt. %, about 5 wt. % to about 10 wt. %, about 10 wt. % to about 20 wt. %, about 13 wt. % to about 20 wt. %, or any ranges therebetween by weight of the chemical sealing pill.

The chemical sealing pill may further include fibers. Fibers may include natural fibers, synthetic fibers, biodegradable fibers, carbon fibers, melt-processed inorganic fibers, basalt fibers, wollastonite fibers, non-amorphous metallic fibers, ceramic fibers, glass fibers, cellulose fibers, viscose cellulosic fibers, oil coated cellulosic fibers, fibers derived from a plant product like paper fibers, and combinations thereof. Examples of biodegradable fibers include fibers composed of modified cellulose, chitosan, soya, modified chitosan, polycaprolactone, polylactic acid, poly (3-hydroxybutyrate), polyhydroxy-alkanoates, polyglycolic acid "PGA", polylactic acid "PLA", polyorthoesters, polycarbonates, polyaspartic acid, polyphosphoesters, soya, or copolymers thereof. In certain examples, the fibers may have a length to diameter aspect ratio in the range of about 2:1 to about 5,000:1.

The chemical sealing pill may further include one or more lost circulation materials. Examples of suitable lost circulation materials may include but are not limited to, cedar bark, shredded cane stalks, mineral fiber, mica flakes, cellophane, calcium carbonate, ground rubber, polymeric materials, pieces of plastic, ground marble, wood, nut hulls, melamine laminates, corncobs, cotton hulls, silica, rubber beads, glass, water-swellable clays, water-swellable polymers, and combinations thereof.

The chemical sealing pill may further include one or more lightweight additives. For example, it may be desirable to use a lightweight additive to decrease a density of a chemical sealing pill. Examples of suitable lightweight additives include, but are not limited to, bentonite, coal, diatomaceous earth, expanded perlite, fly ash, gilsonite, hollow microspheres, low-density elastic beads, nitrogen, pozzolan-bentonite, sodium silicate, or combinations thereof. In some examples, it may be desirable to include a lightweight additive to reduce an overall specific gravity of the chemical sealing pill.

Weighting agents are typically materials that weigh more than water and may be used to increase an overall specific gravity of the chemical sealing pill. By way of example, weighting agents may have a specific gravity of about 2 or higher (e.g., about 2, about 4, etc.). Examples of weighting agents that may be used include hematite, hausmannite, and barite, and combinations thereof. In some examples, the chemical sealing pill may have a specific gravity of about 0.5 to about 3. Alternatively, from about 0.1 to about 0.8, about 0.8 to about 1, about 1 to about 1.2, about 1.2 to about 1.5, about 1.5 to about 1.7, about 1.7 to about 2, about 2 to about 2.2, about 2.2 to about 2.5, about 2.5 to about 3, or any ranges therebetween.

Any of the components of the chemical sealing pill may, whether individually or in combination, have a mean particle size in any suitable range including from about 5 microns to about 7000 microns. Alternatively, from about 5 microns to about 10 microns, about 10 microns to about 20 microns, about 20 microns to about 50 microns, about 50 microns to about 70 microns, about 70 microns to about 100 microns, about 100 microns to about 200 microns, about 200 microns to about 500 microns, about 500 microns to about 1000 microns, about 1000 microns to about 3000 microns, about 3000 microns to about 7000 microns, or any ranges therebetween. For example, any of the metal oxide, metal salt, and/or optional additive may be micronized, milled, bashed, grinded (e.g., inter-grinding) to produce the desired mean particle size. In some examples, a chemical sealing pill may have a multi-modal particle size distribution. By way of example, the chemical sealing pill may have 2, 3, 4, 5, 6, or more modal peaks. Modal peaks occur on a particle size distribution curve when there are increased particle concentrations relative to particle sizes on either side of the curve.

Any component of the chemical sealing pill may, whether individually or in combination, be in a solid phase prior to introduction to the wellbore. For example, a metal salt and metal oxide may be added to an oil-based drilling fluid as a dry powder. Alternatively, such may be mixed with an aqueous or nonaqueous carrier fluid prior to introduction to the oil-based drilling fluid. The components may be fully or at least partially dissolved. Alternatively, the components may be mostly or completely insoluble in the fluid and/or may form a heterogeneous, semi-homogeneous, or pseudo-homogeneous mixture (e.g., fluid suspension).

In certain examples, an acid precursor or delayed acid precursor may be used in the chemical sealing pill to, for example, degrade and release one or more acids to eventually dissolve at least a portion of the set plug formed from the chemical sealing pill. The term "acid precursor" generally refers to a component which itself does not act as an acid by decreasing the pH of a solution into which it is introduced, but which, upon at least partial degradation, will yield one or more components capable of acting as an acid by decreasing the pH of that solution. For example, in certain examples, an acid precursor may at least partially degrade and generate an acid. In some examples, an acid precursor may degrade in response to one or more wellbore conditions. In some examples, the acid precursor may at least partially degrade in response to thermal energy (e.g., the bottom hole temperature). In certain examples, the thermal energy that at least partially degrades the acid precursor may be generated by an exothermic reaction that occurs in the same fluid as the acid precursor or occurs in a location near the acid precursor. For example, the chemical sealing pill of the present disclosure may include reactants that generate a delayed exothermic reaction. The thermal energy from that exothermic reaction may at least partially degrade the acid precursor. For example, in certain examples, sodium nitrite and ammonium chloride may be included in the chemical sealing pill and provide a delayed exothermic reaction.

In certain examples, a suitable acid precursor may include an ester which may degrade into one or more acids, for example, by hydrolyzing with water. In some examples, an acid precursor may include a lactone, a lactide, an acetate ester, a formate ester, a lactate ester, a polyester, an orthoester, or any combination thereof. Examples of acid precursors suitable for certain examples of the present disclosure include, but are not limited to, lactide, glucono-delta-lactone, glucoheptonic lactone, glyceryl diacetate, glyceryl triacetate, ethylene glycol monoformate, diethylene glycol diformate, butyl lactate, propyl lactate, polylactic acid, potassium phosphate monobasic ($KH_2PO_4$), phosphoric acid ($H_3PO_4$), ammonium phosphate monobasic ($NH_4H_2PO_4$), and any combination thereof. In some examples, the acid precursor may degrade into formic acid.

For example, in certain examples, an acid precursor may yield one or more components capable of decreasing the pH of a solution by about 0.1 pH units, about 0.2 pH units, about 0.5 pH units, about 1.0 pH units, about 1.5 pH units, about 2.0 pH units, about 2.5 pH units, about 3.0 pH units, about 4.0 pH units, about 5.0 pH units, about 6.0 pH units, about 7.0 pH units, or any ranges therebetween.

In some examples, an acid precursor may be present in the chemical sealing pill in an amount from about 0.01 wt. % to about 20 wt. % by weight of the chemical sealing pill. Alternatively, about 0.01 wt. % to about 0.5 wt. %, about 0.5 wt. % to about 1 wt. %, about 1 wt. % to about 5 wt. %, about 5 wt. % to about 10 wt. %, about 10 wt. % to about 15 wt. %, about 15 wt. % to about 20 wt. %, or any ranges therebetween.

In some examples, an acid precursor may be a delayed acid precursor. Delayed acid precursors are acid precursor that yield one or more components capable of acting as an acid after a delay period. For example, in certain examples, an acid precursor may be coated or encapsulated by a degradable material. Examples of degradable materials certain for certain examples of the present disclosure include, but are not limited to a resin, a lipid, an acrylic, polyvinylidene, any derivative of the foregoing, and any combination thereof. In some examples, the degradable material may degrade under wellbore conditions which may expose the acid precursor and/or one or more acids generated by the acid precursor to the set plug. In some examples, the delay period may be in an amount from about 0.01 hours to about 500 hours. Alternatively, about 0.01 hours to about 0.1 hours, about 0.1 hours to about 1 hour, about 1 hour to about 2 hours, about 2 hours to about 5 hours, about 5 hours to about 6 hours, about 6 hours to about 10 hours, about 10 hours to about 12 hours, about 12 hours to about 16 hours, about 16 hours to about 20 hours, about 20 hours to about 24 hours, about 24 hours to about 36 hours, about 36 hours to about 50 hours, about 50 hours to about 100 hours, about 100 hours to about 150 hours, about 150 hours to about 200 hours, about 200 hours to about 250 hours, about 250 hours to about 300 hours, about 300 hours to about 500 hours, or any ranges therebetween. Significant degradation may refer, without limitation, to dissolution of more than 25%, 50%, or 75% of the set plug.

In certain examples, the chemical sealing pill further includes an acid inhibitor. In some examples, the acid inhibitor may serve to buffer the chemical sealing pill, and which may counteract the release of acid and stabilize the pH of the chemical sealing pill upon introduction to the wellbore. In some examples, the delay time, which was previously described, may be attributed, at least in part, to the inclusion of the acid inhibitor in the chemical sealing pill. In certain examples, an acid inhibitor may be an acid buffer. The acid buffer may be a conjugated base of a weak acid. For example, acid buffers include, but are not limited to an acetate, a formate, a phosphate, a hydrogen phosphate, a dihydrogen phosphate, an amine, and any combination thereof. In certain examples, an acid inhibitor may include sodium bicarbonate or sodium carbonate. In some examples, an acid inhibitor may be present in the chemical sealing pill in an amount from about 0.01 wt. % to about 5 wt. % by weight of the chemical sealing pill. Alternatively, from about 0.01 wt. % to about 0.1 wt. %, about 0.1 wt. % to about 1 wt. %, about 1 wt. % to about 2 wt. %, about 2 wt. % to about 3 wt. %, about 3 wt. % to about 5 wt. %, or any ranges therebetween.

The chemical sealing pill generally should have a density suitable for a particular application. By way of example, the chemical sealing pill may have a density from about 600 kilograms per cubic meter to about 3000 kilograms per cubic meter. Alternatively, from about 600 kilograms per cubic meter to about 900 kilograms per cubic meter, about 900 kilograms per cubic meter to about 1100 kilograms per cubic meter, about 1100 kilograms per cubic meter to about 1300 kilograms per cubic meter, about 1300 kilograms per cubic meter to about 1500 kilograms per cubic meter, about 1500 kilograms per cubic meter to about 1700 kilograms per cubic meter, about 1700 kilograms per cubic meter to about 1900 kilograms per cubic meter, about 1900 kilograms per cubic meter to about 2100 kilograms per cubic meter, about 2100 kilograms per cubic meter to about 2300 kilograms per cubic meter, about 2300 kilograms per cubic meter to about 2500 kilograms per cubic meter, about 2500 kilograms per cubic meter to about 2700 kilograms per cubic meter, about 2700 kilograms per cubic meter to about 3000 kilograms per cubic meter, and any ranges therebetween.

A set plug formed by curing the chemical sealing pill may have a plug break pressure (PBP) in a range of about 1 MPa to about 18 MPa. Alternatively, about 1 MPa to about 3 MPa, about 3 MPa to about 5 MPa, about 5 MPa to about 7 MPa, about 7 MPa to about 9 MPa, about 9 MPa to about 11 MPa, about 11 MPa to about 13 MPa, about 13 MPa to about 15 MPa, about 15 MPa to about 17 MPa, about 17 MPa to about 20 MPa, or any ranges therebetween.

A set plug formed from curing the chemical sealing pill may, in certain conditions, exhibit solubility when exposed to an acid. An acid may be any suitable acid sufficient to decrease the pH of a lost circulation zone in a wellbore, and may include, for example, hydrochloric acid. For example, in examples wherein the metal salt and metal oxide are magnesium sulfate and magnesium oxide respectively, dissolution of a set plug in water as a result of exposure to acid may be, without being limited to theory, explained by the following reactions.

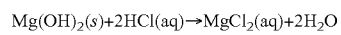

$$Mg(OH)_2(s)+2HCl(aq)\rightarrow MgCl_2(aq)+2H_2O$$

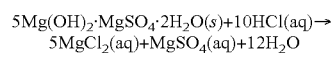

$$5Mg(OH)_2\cdot MgSO_4\cdot 2H_2O(s)+10HCl(aq)\rightarrow\\ 5MgCl_2(aq)+MgSO_4(aq)+12H_2O$$

As shown by the non-limiting example provided, a solid phase metal hydroxide and a hydration product formed by hydration of the chemical sealing pill may, upon exposure to an acid, react to form soluble salts which, upon exposure to water or a polar solvent, may dissolve and leach out of the set plug, diminish mechanical strength, increase material porosity, which may allow the plug to be removed from the lost circulation zone.

The set plug may comprise a cured product formed by the chemical sealing pill. The cured product may include, without limitation, magnesium oxysulfate, magnesium oxychloride, zinc oxychloride and/or zinc oxysulfate. In certain examples, the cured product may be present in the set plug in an amount of about 0.5 kilograms of cured product per liter of set plug to about 2 kilograms of cured product per liter of set plug. Alternatively, from about 0.5 kilograms per liter to about 1 kilogram per liter, about 1 kilogram per liter to about 1.5 kilograms per liter, about 1.5 kilogram per liter to about 2 kilograms per liter, or any ranges therebetween. For example, the cured product may comprise hydrated magnesium oxysulfate having the form

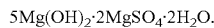
$$5Mg(OH)_2 \cdot 2MgSO_4 \cdot 2H_2O.$$

Examples of the methods described herein may generally include a chemical sealing pill comprising an oleaginous base fluid, a metal salt, and a metal oxide. In some examples, the chemical sealing pill may be prepared by mixing the metal salt and metal oxide directly into an oil-based drilling fluid along with or without additional water, which is thereafter introduced into a subterranean formation. The chemical sealing pill may be introduced into the subterranean formation as an oleaginous spacer fluid (e.g., between oil-based drilling fluid segments in a drill string). In examples, the chemical sealing pill may be batch-mixed separately with a portion of the oil-based drilling fluid, and optionally, water, and introduced into a drill string.

The chemical sealing pill may be introduced into a drill string and flowed into a lost circulation zone where elevated temperature cures the chemical sealing pill to form a set plug, which may seal the lost circulation zone and reduce loss of one or more subsequently introduced fluids to the lost circulation zone. One advantage of the methods presently disclosed is that the set plug formed by the chemical sealing pill may be removed from the lost circulation zone. In addition, the chemical sealing pill may be less corrosive to steel as compared to conventional treatment fluids (e.g., fluids containing chlorides), and thus be more compatible with drilling, pumping, and other equipment.

Figure 2:
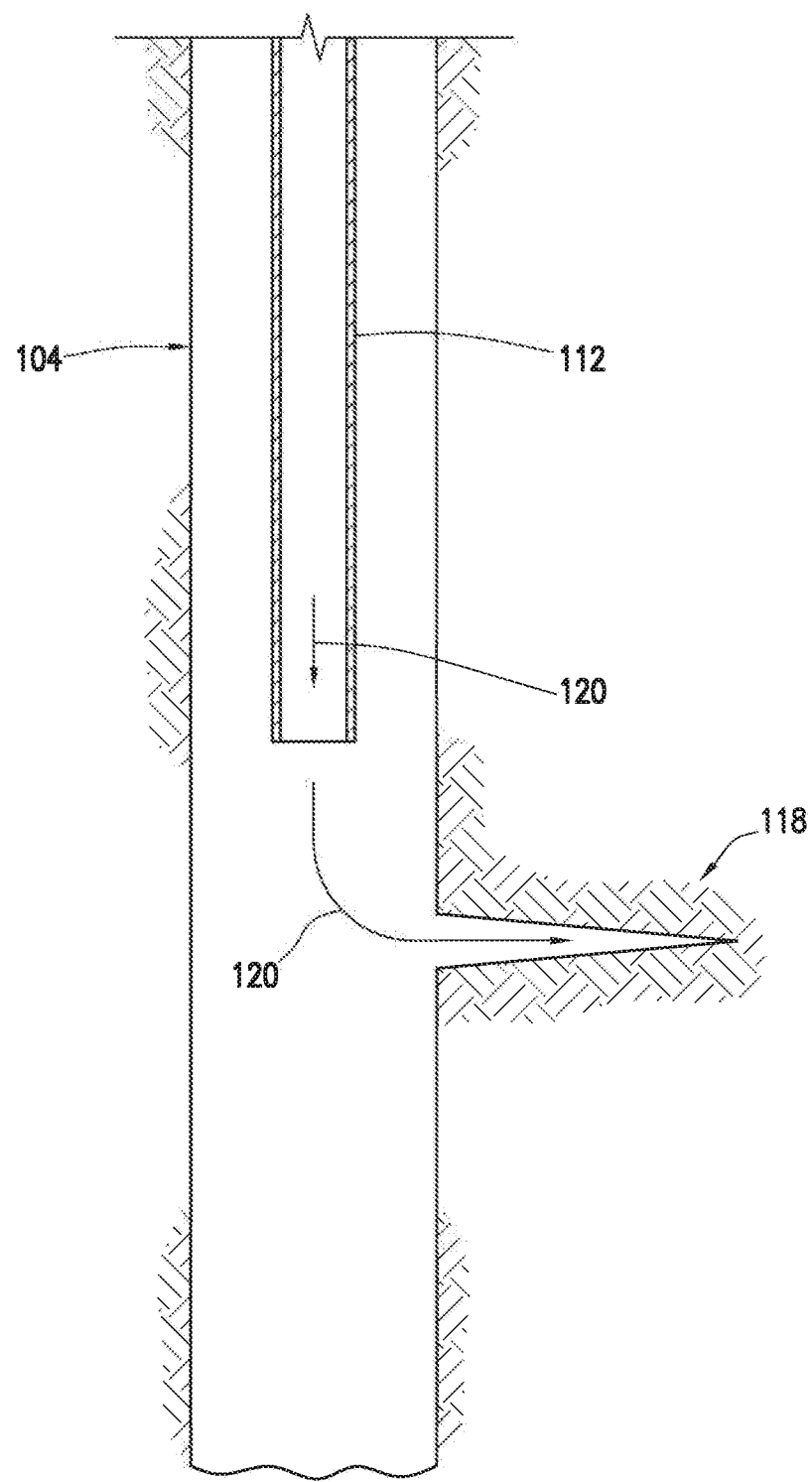
FIG. 2 illustrates the placement of a chemical sealing pill into a lost circulation zone in a wellbore in accordance with some examples of the present disclosure.
Figure 3:
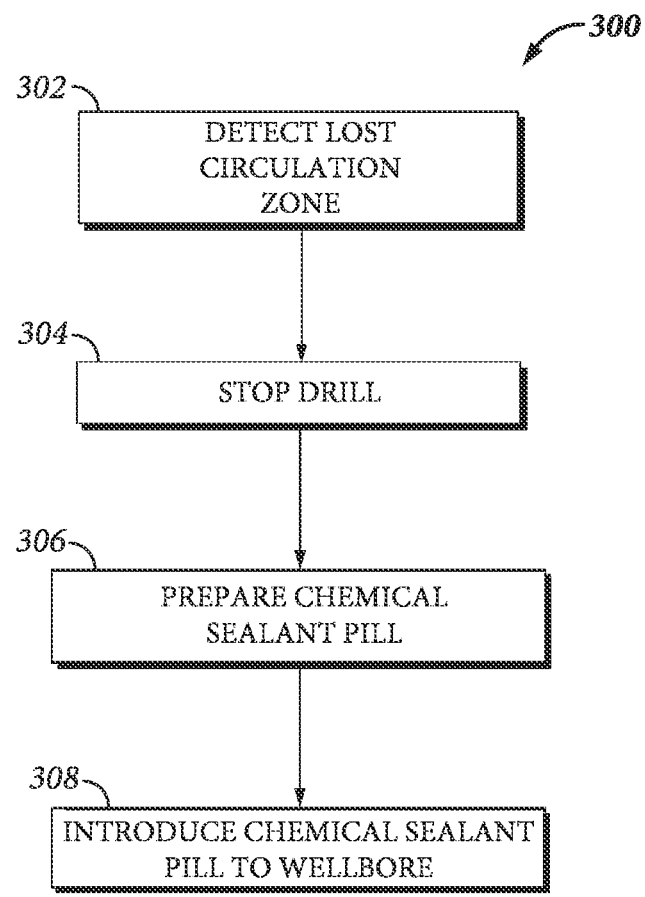
FIG. 3 illustrates a workflow in accordance with some examples of the present disclosure.

Reference is made to FIGS. 1-3, which illustrate a method for sealing a lost circulation zone using the chemical sealing pill disclosed herein. The method may include one or all of the components illustrated on FIGS. 1-3. It should be noted that, while FIGS. 1-3 generally depict land-based systems, the principles described herein are equally applicable to subsea drilling operations that employ floating or sea-based platforms and rigs, without departing from the scope of the disclosure.

FIG. 1 illustrates a system for using a chemical sealing pill while drilling equipment is present in a wellbore in accordance with some examples of the present disclosure. As illustrated, a drilling rig 100 may be positioned on the Earth's surface 102 extending over and around a wellbore 104 that penetrates a subterranean formation 106. While the wellbore 104 is shown extending generally vertically into the subterranean formation 106, the principles described herein are also applicable to wellbores that extend at an angle through the subterranean formation 106, such as horizontal and slanted wellbores. The wellbore 104 may be drilled into the subterranean formation 106 using any suitable drilling technique. In an example, the drilling rig 100 comprises a derrick 108 with a rig floor 110 through which a work string 112 extends downward from the drilling rig 100 into the wellbore 104. Work string 112 may be any such string, casing, or tubular through which a fluid may flow. The work string 112 may deliver a wellbore servicing apparatus (e.g., a drill bit) or some part thereof to a predetermined depth within the wellbore 104. In some examples, at least a portion of the wellbore 104 may be lined with a casing 114 that may be secured into position in the wellbore 104 using cement 116. In alternative examples, the wellbore 104 may be partially cased and cemented thereby resulting in a portion of the wellbore 104 being open hole.

During any one or more wellbore drilling, completion, or servicing operations, a lost circulation zone 118 may be encountered. Where the lost circulation zone 118 is encountered, it may be desirable to employ the chemical sealing pill disclosed herein to prevent, lessen, minimize, and/or cease the loss of fluids to the lost circulation zone 118. Placement of a chemical sealing pill into the lost circulation zone 118 may be an effective means of plugging or sealing off the lost circulation zone 118 and thereby preventing, ceasing, and/or substantially lessening the loss of fluids from the wellbore 104 to the lost circulation zone 118. While the lost circulation zone 118 is shown as an opening that extends from the wellbore 104 into the subterranean formation 106, the lost circulation zone 118 may contain one or more features including, without limitation, fractures, cracks, vugs, channels, openings, and/or the like. Moreover, while the lost circulation zone 118 is illustrated in an open-hole section of the wellbore 104, a lost circulation zone may also occur in a section of the wellbore 104 with the casing 114.

As discussed, lost circulation zone 118 may be sealed with the chemical sealing pill described herein. The chemical sealing pill may be weighted or unweighted and is represented by arrow 120 for introduction into the wellbore. The chemical sealing pill may comprise the metal oxide and metal salt blended with an amount of carrier fluid. The size of the chemical sealing pill will vary depending on the size of the lost circulation zone 118 to be treated. Multiple chemical sealing pills or treatments may be used if needed. Drilling may be stopped while the chemical sealing pill is introduced into and circulated in the wellbore 104.

As illustrated in FIG. 1, the chemical sealing pill, as represented by arrow 120, may be pumped into wellbore 104 via work string 112, which exits below lost circulation zone 118. The chemical sealing pill 120 may be pumped up the wellbore annulus where it may enter lost circulation zone 118. Once spotted into place, the chemical sealing pill 120 may prevent or retard the entry of drilling or other wellbore fluids. Pressure may be used to squeeze the pill into the lost circulation zone 118. Alternatively, a chemical sealing pill may be added to the drilling fluid and circulated with the drilling fluid during drilling or servicing of the well. The metal salt and metal oxide within the pill 120 may set to form a set plug in the wellbore. Formation of the set plug may be accelerated by one or more downhole conditions including, for example, temperature. A downhole temperature sufficient to accelerate setting of the chemical sealing pill may be in a range of between about 35° C. to about 400° C., between about 35° C. to about 85° C., about 85° C. to about 120° C., about 120° C. to about 200° C., about 200° C. to about 400° C., or ranges therebetween. The formation of the set plug may enhance the ability of the chemical sealing pill 120 to prevent, cease, and/or substantially lessen the loss of fluids from the wellbore 104 to the lost circulation zone 118. If it is desirable to remove at least a portion of the pill 120, for example, if the pill 120 is interfering with a producing zone, the pill 120 may be exposed to acid (e.g., hydrochloric acid, organic acids, mineral acids). Once exposed, at least a portion of the pill 120 may dissolve and be removed from the lost circulation zone.

FIG. 2 illustrates a method for introducing the chemical sealing pill in the lost circulation zone 118 by work string 112. In FIG. 2, work string 112 exits above lost circulation zone 118. The chemical sealing pill may be placed in the lost circulation zone 118 by work string 112. The chemical sealing pill may travel upwards and downward through, for example, an annulus between an outer surface of the work string 112 and an inner surface of the wellbore 114. Optionally, a set plug may be placed below the lost circulation zone 118. The chemical sealing pill, represented by arrow 120, may be pumped into a portion of the wellbore 114 near, proximate to, or within the lost circulation zone 118. At least a portion of the chemical sealing pill 120 may enter into the lost circulation zone 118 to prevent, cease, and/or substantially lessen the loss of fluids from the wellbore 104 to the lost circulation zone 118. It is contemplated that in instances where only a portion of the chemical sealing pill introduced into wellbore 104 enters the lost circulation zone to form the set plug, unreacted metal salt and metal oxide of the chemical sealing pill may at first fail to react and form the set plug and may be circulated back to the surface. In some examples, it is further contemplated that at least a portion of the initially introduced portion which failed at first to react and take part in forming of the set plug may, upon reentry to the wellbore, take part in the formation of the set plug or an additional set plug in the first or a new lost circulation zone after exiting and reentering the wellbore, for example, at surface 102.

While the examples shown and described herein generally refer to the chemical sealing pill as flowing into lost circulation zone 118 as part of the oil-based drilling fluid, that the chemical sealing pill may alternatively be introduced to the work string 112 as a spacer fluid, wherein, for example, an oil-based or a non-oil-based drilling fluid is introduced into work string 112 immediately prior and/or immediately after the chemical sealing pill. Alternatively, in some examples, a chemical sealing pill may be more simply described as being disposed between two oil-based, aqueous, nonaqueous, or non-oil-based drilling fluid segments in work string 112, disposed above a drilling fluid segment in a work string 112, or disposed below a drilling fluid segment in a work string 112.

Turning now to FIG. 3, a method 300 of introducing a chemical sealing pill to a lost circulation zone of a subterranean formation may be performed with, for example, the subterranean environments shown and described in FIGS. 1 and 2. In operation, drilling of a subterranean formation may occur with a drill disposed in a drill string. An oil-based drilling fluid may be circulated to the drill by flowing the oil-based drilling fluid to the drill and up to the surface. Material may be removed from the wellbore by the circulated fluid, such as cuttings and particulate matter. Fluid once used in the drill string may be cleaned at the surface, resupplied to the drill, and the "recirculated" or "circulated" in the drill string. A lost circulation zone may be detected in box 302. Detection of a lost circulation zone in box 302 may be performed by any suitable means including by observing a lost circulation event, otherwise referred to herein as a "lost circulation condition," such as when a decreased flow rate of drilling fluid being circulated is observed, or when a decreased flow rate exiting the wellbore 104 at surface 102 is observed. By observing a difference in flow rates between an amount of fluid being pumped into a wellbore and an amount of fluid exiting the wellbore (e.g., a flow rate of fluid recovered by a shale shaker), or by comparing a measured or observed flow rate of recovered fluid to an expected flow rate of recovered fluid, the lost circulation zone may be detected. In some examples of method 300, detection of a lost circulation event may be achieved in real-time or in advance, such as by assessing geological formation data from one or more sensors using known means (e.g., data deduced from surface observations, P-wave vertical seismic profiling, S-wave vertical seismic profiling, P-wave tomography, P-wave reflection, acoustic logs, acoustic emissions, electric profiling, electric resistivity tomography, formation micro scanners, radar, ground-penetrating radar, neutron logs, resistivity logs, density logs, gamma ray logs, caliber logs, temperature logs, fluid conductivity logs, core inspection, optical imaging, tiltmeter methods, flowmeters, acoustic doppler flowmeters, electromagnetic flowmeters, heat pulse flow meters, etc.) and anticipating the lost circulation. It may be desirable to prophylactically deploy a chemical sealing pill prior to actual detection of a lost circulation event, and the chemical sealing pill may be introduced to the wellbore during drilling and/or in advance of encountering the lost circulation zone and/or before block 302 to mitigate a lost circulation condition.

With continued reference to FIG. 3, it may be desirable in block 302 to interrupt drilling to, for example, prevent further loss of a drilling or other treatment fluid to the lost circulation zone. Interruption of drilling may occur, for example, by reducing or eliminating an amount of energy (e.g., power) being supplied to a drill, such as by reducing or stopping an amount of electrical energy, mechanical energy, chemical energy, hydraulic energy, pneumatic energy, etc., supplied to the drill. For example, the number of rotations per minute (RPM) of one or more drill bits of a drill may be reduced. Alternatively, block 304 may be bypassed such that drilling is not interrupted, wherein the chemical sealing pill is introduced into a wellbore and/or a lost circulation zone without stopping the drill.

With further reference to FIG. 3, it may be desirable in block 306 to prepare the chemical sealing pill such as, for example, at a location disposed above the Earth's surface 102 (referring to FIG. 1). In some examples, the chemical sealing pill may be prepared by mixing at least a metal salt and a metal oxide, and optionally, water, with at least a portion of oil-based drilling fluid in one or more mixers, such as a tumbler, ribbon mixer, muller, static mixer, jet mixer, drum mixer, blender, homogenizer, paddle mixer, high shear mixer, rotating mixer, motorized mixer, batch mixer, or any suitable apparatus. The portion of oil-based drilling fluid may be separated and/or removed from a recirculated wellbore fluid, such as from a mud pit, as effluent from a shale shaker, or may comprise or be separated from at least a portion of non-recirculated drilling fluid, such as from a drilling fluid make-up stream. Alternatively, in certain examples, the chemical sealing pill may be prepared by mixing at least a metal salt and a metal oxide with a carrier fluid or solvent prior to introduction of the metal salt and metal oxide to the oil-based drilling fluid, such that, for example, the metal salt and metal oxide are introduced to the oil-based drilling fluid in a liquid, fluid, or at least partially dissolved phase. Yet alternatively, the metal salt and metal oxide may be introduced directly to an active oil-based drilling fluid without surface mixing with a portion of the oil-based drilling fluid, carrier fluid, or solvent, such as by directly introducing the metal salt and metal oxide in a solid phase to the oil-based drilling fluid. Addition of a solid phase metal salt and metal oxide may be accomplished at the surface, for example, in a manner as simple as dumping (e.g., shoveling) portions of a dry mixture thereof directly to an oil-based shaker effluent or to any suitable location in fluid communication with the oil-based drilling fluid fed to the wellbore. As mentioned, mixing of the metal salt and metal oxide with the oil-based drilling fluid may occur in one or more mixers. Alternatively, or additionally, mixing may naturally occur downhole as the oil-based drilling fluid is flowed down a work string and/or upon coming into fluid communication with one or more rotating drill bits of a drill. Shear may be separately applied to the chemical sealing pill, for example, in examples where the chemical sealing pill is a stagnant or reserve mixture and/or prior to introduction of the metal salt and metal oxide to a wellbore so as to prevent premature setting of the chemical sealing pill and/or to prepare the mixture for timely setting of the chemical sealing pill. Shear may be applied by any suitable means including with a high shear mixer, a low shear mixer, a high-shear in-line mixer, ultra-high-shear mixer, ultra-high-shear inline mixer, high-shear granulator, high viscosity mixer, a batch high-shear mixer, via one or more rotors, impellers, stators, arrays thereof, pipes, tanks, or combinations thereof. Applying a shear may comprise shearing at a shear rate of at least 2,000 fpm, 3,000 fpm, 4,000 fpm, 6,000 fpm, 8,000 fpm, or 11,000 fpm. Depending on the timing and/or magnitude of a lost circulation event, shear may be continuously applied to a batch for at least 4 min, at least 10 min, at least 15 min, at least an hour, and/or indefinitely until a lost circulation even occurs. Alternatively, a batch may be sheared sporadically as needed or intermittently. Yet alternatively, the chemical sealing pill may be sheared continuously in a continuous stirred-tank type mixer.

In examples where a retarder is used, a set retarder may be introduced to a drill string along with the chemical sealing pill, may be batch mixed with the chemical sealing pill, may be included with the metal salt and metal oxide and/or optionally, water, prior to mixing with the oil-based drilling fluid, may be added to a liquid, such as a solution comprising a solvent and the metal salt and metal oxide, or may be included with the chemical sealing pill or introduced to the drill string in any suitable fashion.

As mentioned previously, and with continued reference to FIG. 3, an acid may be subsequently introduced into the wellbore after bock 308 to dissolve the set plug. The acid may be introduced to the wellbore in any suitable manner, such as with an acidic treatment fluid during a shut-in period. The length of a shut-in procedure may be an amount from about 0.1 hours to 24 hours. Alternatively, from about 0.1 hours to about 0.5 hours, about 0.5 hours to about 1 hour, about 1 hour to about 4 hours, about 4 hours to about 6 hours, about 6 hours to about 12 hours, about 12 hours to about 16 hours, about 16 hours to about 24 hours, or any ranges therebetween.

At least a portion of the set plug may dissolve, be removed from the lost circulation zone, and in some examples, recirculated to the surface. Any suitable acid may be used including, for example, inorganic acids (e.g., hydrochloric acid), organic acids (e.g., carboxylic acid, lactic acid, acetic acid, formic acid, citric acid, oxalic acid, uric acid, malic acid, tartaric acid, itaconic acid, gluconic acid, phenolic acids), and other mineral acids (e.g., sulfuric acid, nitric acid, perchloric acid, boric acid, phosphoric acid, hydrobromic acid, hydroiodic acid).

Accordingly, the present disclosure may provide methods for mitigating a lost circulation event. The methods may include any of the various features disclosed herein, including one or more of the following statements.

Statement 1. A method comprising: circulating an oil-based drilling fluid though a drill string to extend a wellbore through a subterranean formation, wherein the oil-based drilling fluid comprises an invert emulsion; separating at least a portion of the oil-based drilling fluid from the circulated oil-based drilling fluid to form a separated portion of oil-based drilling fluid; mixing a metal salt and a metal oxide into the separated portion of the oil-based drilling fluid to form a chemical sealing pill; introducing the chemical sealing pill into the drill string and flowing the chemical sealing pill into a lost circulation zone in the subterranean formation; allowing at least a portion of the chemical sealing pill to set in the lost circulation zone to form a set plug, wherein the set plug seals the lost circulation zone and reduces loss of fluid into the lost circulation zone from subsequently introduced fluids; and preventing loss of fluid into the lost circulation zone from subsequently introduced fluids with the set plug.

Statement 2. The method of statement 1, further comprising introducing the separated portion of the oil-base drilling fluid into a batch mixer, wherein mixing of the metal salt and the metal oxide into the separated portion of the oil-based drilling fluid occurs in the batch mixer.

Statement 3. The method of any of statements 1-2, wherein the separating of the portion comprises separating at least the oil-based drilling fluid from a mud pit.

Statement 4. The method of any of statements 1-3, wherein the metal salt and the metal oxide are provided as a liquid additive comprising a carrier fluid, the metal salt, and the metal oxide, and wherein the liquid additive is introduced to the separated portion of the oil-based drilling fluid.

Statement 5. The method of any of statements 1-4, further comprising circulating at least a portion of the chemical sealing pill to a surface, wherein the surface is an entry point of the wellbore into the subterranean formation.

Statement 6. The method of any of statements 1-5, further comprising applying shear to the chemical sealing pill in a mixer prior to introducing the chemical sealing pill into the lost circulation zone.

Statement 7. The method of any of statements 1-6, further comprising exposing the set plug to an acid, allowing at least a portion of the set plug to dissolve to form a dissolved portion; and removing the dissolved portion from the lost circulation zone.

Statement 8. The method of any of statements 1-7, wherein the metal salt comprises magnesium sulfate, wherein the metal oxide comprises magnesium oxide, and wherein the set plug comprises magnesium oxysulfate.

Statement 9. The method of any of statements 1-8, wherein the metal salt and the metal oxide are added to the chemical sealing pill in a combined amount of between about 500 grams to about 5,000 grams per liter of oil-based drilling fluid.

Statement 10. The method of any of statements 1-9, wherein the chemical sealing pull further comprises a retarder.

Statement 11. The method of any of statements 1-10, wherein the chemical sealing pill additionally comprises an acid precursor or a delayed acid precursor.

Statement 12. A method comprising: introducing a metal salt and a metal oxide into a portion of an oil-based drilling fluid, wherein a weight ratio of the metal salt to metal oxide in the portion of oil-based drilling fluid is in a range from about 1:1 to about 1:4, and wherein the oil-based drilling fluid comprises an invert emulsion; introducing the portion of oil-based drilling fluid into a lost circulation zone; allowing the portion of the oil-based drilling fluid to at least partially set in the lost circulation zone to form a set plug, wherein the set plug seals the lost circulation zone and reduces loss of fluid into the lost circulation zone from subsequently introduced fluids; and preventing loss of fluid into the lost circulation zone from subsequently introduced fluids with the set plug.

Statement 13. The method of statement 12, further comprising adding water to the portion of oil-based drilling fluid prior to introducing the portion of oil-based drilling fluid into the lost circulation zone.

Statement 14. The method of any of statements 12-13, wherein the metal salt comprises magnesium sulfate, and wherein the metal oxide comprises magnesium oxide.

Statement 15. The method of any of statements 12-14, further comprising: exposing the set plug to an acid; allowing at least a portion of the set plug to dissolve to form a dissolved portion of the set plug; and removing the dissolved portion of the set plug from the lost circulation zone.

Statement 16. The method of statement 15, wherein the acid comprises at least one acid selected from the group consisting of hydrochloric acid, an organic acid, a mineral acid, and any combination thereof.

Statement 17. The method of any of statements 12-16, wherein the metal oxide comprises a first metal oxide component and a second metal oxide component, the first metal oxide component having undergone calcination at a first temperature, and the second metal oxide component having undergone calcination at a second temperature.

Statement 18. The method of any of statements 12-17, wherein the portion of oil-based drilling fluid comprises oil-based drilling fluid from a make-up stream.

Statement 19. A method comprising: extending a wellbore through a subterranean formation with at least a drill disposed on a drill string while circulating an oil-based drilling fluid to the drill; detecting a lost circulation zone in the subterranean formation; separating a portion of fluid from the circulating oil-based drilling fluid to form a pill; mixing the pill with a metal salt and a metal oxide to form a chemical sealing pill; and introducing the chemical sealing pill into the subterranean formation to mitigate a lost circulation event.

Statement 20. The method of statement 19, further comprising adding water to the portion of fluid separated from the circulating oil-based drilling fluid.

The exemplary chemical sealing pills disclosed herein may directly or indirectly affect one or more components or pieces of equipment associated with the preparation, delivery, recapture, recycling, reuse, and/or disposal of the disclosed chemical sealing pills. For example, the disclosed chemical sealing pills may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary lost circulation compositions. The disclosed chemical sealing pills may also directly or indirectly affect any transport or delivery equipment used to convey the chemical sealing pill to a well site or downhole such as, for example, any transport vessels, conduits, pipelines, trucks, tubulars, and/or pipes used to compositionally move the chemical sealing pill from one location to another, any pumps, compressors, or motors (e.g., topside or downhole) used to drive the chemical sealing pill into motion, any valves or related joints used to regulate the pressure or flow rate of the lost circulation compositions, and any sensors (i.e., pressure and temperature), gauges, and/or combinations thereof, and the like. The disclosed chemical sealing pill may also directly or indirectly affect the various downhole equipment and tools that may come into contact with the chemical sealing pill such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

To facilitate a better understanding of the present invention, the following examples of certain aspects of some examples are given. In no way should the following examples be read to limit, or define, the entire scope of the disclosure.

Example 1

This example was performed to evaluate the plug break pressure (PBP) of various test samples at various curing temperatures. PBP may represent an amount of differential pressure a plug can sustain before it is extruded into a fracture or vug. Each test sample included 60 wt. % combined magnesium sulfate salt and magnesium oxide (Bara-CS), and an oil-based drilling fluid. The appropriate amounts of each were measured and combined. Each sample was then individually sheared for 5 minutes. After shearing, each sample was transferred to a permeability plugging apparatus cell (PPA) and allowed to cure for 4 hours at 65.6° C., 121.1° C., and 148.9° C. respectively. After the four hours, the plug break pressures of the set plugs formed by the cured samples were tested against a 40 mm vug adapter. The results of the tests are provided in Table 1 below.

TABLE 1

| Sample No. | MgO (g) | MgSO$_4$ (g) | Oil-based mud (mL) | Water (mL) | Curing Time (hours) | Curing Temperature (° F.) | PBP Value (psi) |
|---|---|---|---|---|---|---|---|
| 1 | 144 | 96 | 143 | 66 | 4 | 150 (65.6° C.) | 500 (3.45 MPa) |
| 2 | 144 | 96 | 143 | 66 | 4 | 250 (121.1° C.) | 1000 (6.89 MPa) |
| 3 | 144 | 96 | 143 | 66 | 4 | 300 (148.9° C.) | 2400 (16.55 MPa) |

Example 2

This example was performed to evaluate plug break pressure of various test samples having various levels of mud contamination. Each test sample included 60 wt. % combined magnesium sulfate salt and magnesium oxide (Bara-CS), and a first volume of an oil-based mud. For each sample, a second volume of oil-based mud was added to the sample to test the plug break pressure of a chemical sealing pill hypothetically contaminated with additional oil-based drilling fluid. The appropriate amounts of each component were measured and combined for each sample. Each sample was then individually sheared for 5 minutes. After shearing, each sample was transferred to a permeability plugging apparatus cell (PPA) and allowed to cure for 4 hours at 250° F. After the four hours, the plug break pressures of the set plugs formed by the cured samples were tested against a 40 mm vug adapter. The results of the tests are provided in Table 2 below.

TABLE 2

| Sample No. | MgO/MgSO₄ weight ratio | Mud Contamination (%) | Curing Time (hours) | Curing Temperature (° F.) | PBP Value (psi) |
|---|---|---|---|---|---|
| 4 | 144/96 | 0 (0 mL) | 4 | 250 (121.1° C.) | 1000 (6.89 MPa) |
| 5 | 144/96 | 25 (35.75 mL) | 4 | 250 (121.1° C.) | 1000 (6.89 MPa) |
| 6 | 144/96 | 50 (71.5 mL) | 4 | 250 (121.1° C.) | 400 (2.76 MPa) |

Example 3

This example was performed to evaluate the acid solubility of various test samples after a varying amount of curing time. Each test sample included 60 wt. % combined magnesium sulfate salt and magnesium oxide (Bara-CS), and an oil-based mud. The appropriate amounts of each component were measured and combined for each sample. Each sample was then individually sheared for 5 minutes. After shearing, each sample was transferred to a permeability plugging apparatus cell (PPA) and allowed to cure for 4 hours at 121.1° C. After the four hours, 2.5 g of each cured sample was each placed in 350 mL of a 15% HCl solution and allowed to dissolve for 1 hour, 16 hours, 24 hours, and 48 hours respectively. Acid solubility was determined by vacuum filtering the solution and weighing the remaining undissolved solid material on an electronic weighing scale. The results of the tests are provided in Table 3 below.

TABLE 3

| Sample No. | Weight of Sample (g) | MgO to MgSO₄ weight ratio | Bara-CS (wt. %) | Curing Time (hours) | 15% HCl exposure time at 150° F. (hours) | Solubility (%) |
|---|---|---|---|---|---|---|
| 7 | 2.5 | 144/96 | 60 | 4 | 1 | 93.19 |
| 8 | 2.5 | 144/96 | 60 | 4 | 16 | 93.53 |
| 9 | 2.5 | 144/96 | 60 | 4 | 24 | 94.45 |
| 10 | 2.5 | 144/96 | 60 | 4 | 48 | 94.99 |

Example 4

This example was performed to evaluate the rheological properties of various test samples after mixing. Each test sample included varying weight percentages ranging from 0 wt. % to 60 wt. % of the combined magnesium sulfate salt and magnesium oxide (Bara-CS), and an oil-based mud. The oil-based mud was taken from an active drilling operation and is referred to as '78 pcf OBM' below. The appropriate amounts of each component were measured and combined for each sample. Each sample was then individually sheared for 5 minutes. After shearing, a dial reading was obtained for each sample using a FANN 35 Viscometer in accordance with API RP A gel strength was also obtained at 10 seconds, 10 minutes, and 30 minutes for each sample. A plastic viscosity and yield point were also obtained. Lastly, a bottle test was performed after 2 hours for each sample, or under 2 hours if the sample quickly formed a hard set. The results of the tests are provided in Table 4 below.

TABLE 4

| Rheology, 120° F. | 78 pcf OBM | 78 pcf OBM:Bara-CS | | |
|---|---|---|---|---|
| | | 75:25 | 50:50 | 25:75 |
| 600 rpm | 140 | — | 147 | — |
| 300 rpm | 78 | — | 89 | — |
| 200 rpm | 56 | — | 70 | — |
| 100 rpm | 34 | — | 46 | — |
| 6 rpm | 9 | — | 14 | — |
| 3 rpm | 7 | — | 12 | — |
| 10 sec gel, (lb/100 ft²) | 9 | — | 14 | — |
| 10 min gel, (lb/100 ft²) | 19 | — | 110 | — |
| 30 min gel, (lb/100 ft²) | 20 | — | 300+ | — |
| Plastic viscosity, (cP) | 62 | — | 58 | — |
| Yield point, (lb/100 ft²) | 16 | — | 31 | — |
| Bottle Test, (120° F.) | Flowable | Partially gelled | Hard set | Hard set |

*pcf is a unit of density (pound per cubic feet) of the mud system used during testing (81 pcf is 1297.5 kilograms per cubic meter)

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present examples are well adapted to attain the ends and advantages mentioned as well as those that are inherent therein. The particular examples disclosed above are illustrative only, as the present examples may be modified and practiced in different but equivalent manners apparent to those skilled in the art having the benefit of the teachings herein. Although individual examples are discussed, all combinations of each example are contemplated and covered by the disclosure. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative examples disclosed above may be altered or modified and all such variations are considered within the scope and spirit of the present disclosure.

What is claimed is:

1. A method comprising:
   circulating an oil-based drilling fluid though a drill string to extend a wellbore through a subterranean formation, wherein the oil-based drilling fluid comprises an invert emulsion;
   separating at least a portion of the oil-based drilling fluid from the circulated oil-based drilling fluid to form a separated portion of oil-based drilling fluid;
   mixing a metal salt and a metal oxide into the separated portion of the oil-based drilling fluid at a surface location to form a mixture and shearing the mixture at the surface location to form a chemical sealing pill, wherein the chemical sealing pill comprises the portion of the oil-based drilling fluid, the metal salt, and the metal oxide;
   after mixing and shearing, introducing the chemical sealing pill into the drill string as a single mixture and flowing the chemical sealing pill into a lost circulation zone in the subterranean formation;
   allowing at least a portion of the chemical sealing pill to set in the lost circulation zone to form a set plug, wherein the set plug seals the lost circulation zone and reduces loss of fluid into the lost circulation zone from subsequently introduced fluids; and
   preventing loss of fluid into the lost circulation zone from subsequently introduced fluids with the set plug.

2. The method of claim 1, further comprising introducing the separated portion of the oil-base drilling fluid into a batch mixer, wherein mixing of the metal salt and the metal oxide into the separated portion of the oil-based drilling fluid occurs in the batch mixer.

3. The method of claim 1, wherein the separating of the portion comprises separating at least the oil-based drilling fluid from a mud pit.

4. The method of claim 1, wherein the metal salt and the metal oxide are provided as a liquid additive comprising a carrier fluid, the metal salt, and the metal oxide, and wherein the liquid additive is introduced to the separated portion of the oil-based drilling fluid.

5. The method of claim 1, further comprising circulating at least a portion of the chemical sealing pill to a surface, wherein the surface is an entry point of the wellbore into the subterranean formation.

6. The method of claim 1, wherein the shearing comprising applying a shearing force to the chemical sealing pill in a mixer for at least 4 minutes prior to introducing the chemical sealing pill into the lost circulation zone.

7. The method of claim 1, further comprising exposing the set plug to an acid, allowing at least a portion of the set plug to dissolve to form a dissolved portion; and removing the dissolved portion from the lost circulation zone.

8. The method of claim 1, wherein the metal salt comprises magnesium sulfate, wherein the metal oxide comprises magnesium oxide, and wherein the set plug comprises magnesium oxysulfate, wherein the magnesium oxysulfate is present in the set plug in a concentration from about 0.5 kilograms per liter to about 2 kilograms per liter of the set plug.

9. The method of claim 1, wherein the metal salt and the metal oxide are added to the chemical sealing pill in a combined amount of between about 500 grams to about 5,000 grams per liter of oil-based drilling fluid.

10. The method of claim 1, wherein the chemical sealing pill further comprises a retarder.

11. The method of claim 1, wherein the chemical sealing pill further comprises an acid precursor or a delayed acid precursor.

12. A method comprising:
    introducing a metal salt and a metal oxide into a portion of an oil-based drilling fluid, wherein a weight ratio of the metal salt to metal oxide in the portion of oil-based drilling fluid is in a range from about 1:1 to about 1:4, and wherein the oil-based drilling fluid comprises an invert emulsion;
    mixing and shearing the portion of the oil-based drilling fluid containing the metal salt and the metal oxide at a surface location to form a chemical sealing pill;
    after mixing and shearing, introducing the chemical sealing pill into a lost circulation zone as a single mixture, wherein the chemical sealing pill comprises oil-based drilling fluid, the metal salt, and the metal oxide;
    allowing the portion of the oil-based drilling fluid to at least partially set in the lost circulation zone to form a set plug, wherein the set plug seals the lost circulation zone and reduces loss of fluid into the lost circulation zone from subsequently introduced fluids; and
    preventing loss of fluid into the lost circulation zone from subsequently introduced fluids with the set plug.

13. The method of claim 12, further comprising adding water to the portion of oil-based drilling fluid prior to introducing the portion of oil-based drilling fluid into the lost circulation zone.

14. The method of claim 12, wherein the metal salt comprises magnesium sulfate, and wherein the metal oxide comprises magnesium oxide.

15. The method of claim 12, further comprising: exposing the set plug to an acid; allowing at least a portion of the set plug to dissolve to form a dissolved portion of the set plug; and removing the dissolved portion of the set plug from the lost circulation zone.

16. The method of claim 15, wherein the acid comprises at least one acid selected from the group consisting of hydrochloric acid, an organic acid, a mineral acid, and any combination thereof.

17. The method of claim 12, wherein the metal oxide comprises a first metal oxide component and a second metal oxide component, the first metal oxide component having undergone calcination at a first temperature, and the second metal oxide component having undergone calcination at a second temperature.

18. The method of claim 12, wherein the portion of oil-based drilling fluid comprises oil-based drilling fluid from a make-up stream.

19. A method comprising:

extending a wellbore through a subterranean formation with at least a drill disposed on a drill string while circulating an oil-based drilling fluid to the drill;

detecting a lost circulation zone in the subterranean formation;

separating a portion of fluid from the circulating oil-based drilling fluid;

mixing the separated portion with a metal salt and a metal oxide at a surface location to form a mixture and shearing the mixture at the surface location to form a chemical sealing pill, wherein the chemical sealing pill comprises the separated portion of the oil-based drilling fluid, the metal salt, and the metal oxide; and after mixing and shearing, introducing the chemical sealing pill as a single mixture into the subterranean formation to mitigate a lost circulation event.

20. The method of claim 19, further comprising adding water to the portion of fluid separated from the circulating oil-based drilling fluid.

* * * * *